United States Patent [19]
Johnson

[11] Patent Number: 4,542,656
[45] Date of Patent: Sep. 24, 1985

[54] FLUID FLOW MONITORING

[75] Inventor: Rodney C. Johnson, Burgess Hill, England

[73] Assignee: Bestobell Sparling Limited, Sussex, England

[21] Appl. No.: 554,192

[22] Filed: Nov. 22, 1983

[30] Foreign Application Priority Data

Nov. 30, 1982 [GB] United Kingdom ............... 8234110

[51] Int. Cl.⁴ .............................................. G01F 1/66
[52] U.S. Cl. ................................................ 73/861.28
[58] Field of Search ................. 73/597, 861.27, 861.28

[56] References Cited

U.S. PATENT DOCUMENTS 4,384,491  5/1983  Brown et al. .................... 73/861.28

Primary Examiner—Charles A. Ruehl
Attorney, Agent, or Firm—Erwin S. Teltscher

[57] ABSTRACT

A method and an apparatus for (a) monitoring fluid flow by transmitting acoustic signals in opposite directions through a fluid with components in the direction of flow; (b) receiving the transmitted signals; (c) providing a first signal representing acoustic velocity; (d) time-integrating the first signal to produce a ramp signal, the rate of change of which represents acoustic velocity in the fluid; (e) transmitting a first acoustic signal in one direction through a fluid; (f) transmitting a second acoustic signal in the opposite direction through the fluid; and (g) initiating integration of the first signal. The ramp signal is compared with a second signal representing fluid flow velocity to generate first and second arrival signals according to the direction of the transmitted acoustic signal; expected arrival times for the transmitted acoustic signals are compared with the actual arrival times of the transmitted acoustic signals, and the results of the comparisons are stored. The stored results from two successive acoustic signal transmissions are then compared so as to either modify the first signal, if both acoustic signals arrived earlier or later than their respective expected arrival times, or to modify the second signal, if one acoustic signal arrived before, and the other after their respective expected arrival times.

9 Claims, 9 Drawing Figures

FLUID FLOW MONITORING

FIELD OF THE INVENTION

The invention relates to a method and apparatus for monitoring fluid flow.

BACKGROUND OF THE INVENTION

A well known apparatus for monitoring fluid flow is of the kind comprising means for transmitting acoustic signals in opposite directions through a fluid with components in the direction of flow; means for receiving transmitted signals; and means for sensing the received acoustic signals and for providing a signal representative of the fluid flow velocity.

One example of such an apparatus is illustrated in British Patent Specification No. 1,285,175 in which acoustic signals, usually ultrasonic signals, are transmitted alternately in upstream and downstream directions by a pair of transducers the arrival of a transmitted signal at one transducer causing the other transducer to transmit another signal. This method of transmission is known as "sing-around". The time for a signal to travel through the fluid from one transducer to the other is dependent upon the velocity of the fluid in the direction of transmission, the velocity of sound in the fluid, and the path length. By determining the rate at which each transducer transmits a signal, both the fluid flow velocity and the acoustic sound velocity can be determined. One of the major problems with this apparatus is that no account is taken of the fact that acoustic velocity itself can change due to changes in temperature in the liquid. Furthermore, the read out time for such a flow meter, that is the time required to measure the difference in frequencies to the required accuracy, can be long, especially when low flow rates are being monitored.

A more recent proposal is described in British Patent Specification No. 1,422,791. A pair of variable frequency voltage controlled oscillators are used to cause a series of pulses to be transmitted upstream and downstream, the frequency of each oscillator being varied in accordance with the time of arrival of the received pulse so that a fixed number N of oscillations occurs between the transmission and receipt of a pulse. By comparing the two frequencies arrived at, the fluid flow velocity can be determined. In this case, accurate control of voltage controlled oscillators is very difficult and since the difference in upstream and downstream times of flight is of the order of microseconds, any frequency errors in the voltage controlled oscillators are significant.

Another flowmeter is described in British Patent Specification No. 1,551,744. This specification describes the use of one or more voltage controlled oscillators which are modulated with two signals. One controls the average frequency of the VCO and the other modulates the average frequency up and down corresponding to downstream and upstream measuring directions. An alternative embodiment describes the use of a ramp whose slope is modulated in exactly the same manner using two modulating signals. Although this construction enables the sound speed of the fluid to be compensated for, one of the main difficulties is that the level of the modulation voltage corresponding to the flow velocity information must necessarily be extremely small. Another disadvantage is that the system is unbalanced since a linear time function is converted to an inverse time function. The effect of this is that when measuring flow, by taking the mean of the up and down stream VCO frequencies or ramp rate, this mean is not the same as when a zero flow condition exists.

SUMMARY OF THE INVENTION

In accordance with one aspect of the present invention, a method of monitoring fluid flow comprises causing acoustic signals to be transmitted through the fluid in directions with components in the direction of flow, successive acoustic signals being transmitted in opposite directions through the fluid, and initiating in correspondence with each acoustic signal a changing control function the rate of change of which represents acoustic velocity in the fluid; receiving the transmitted acoustic signals; comparing the control function with a signal representing the fluid flow velocity to generate expected arrival times for the transmitted acoustic signals, represented by times at which the control function reaches a threshold; comparing the expected arrival times with the actual arrival times of the transmitted acoustic signals, and storing the results of the comparisons; and comparing the stored results from two successive acoustic signal transmissions either to modify the rate of change of the control function if both acoustic signals arrived earlier or later than their expected arrival times; or to modify the signal representing fluid flow velocity if one acoustic signal arrived before and the other after their expected arrival times.

With this new method, information is obtained not only from the actual time of flight in each direction but also by comparing the arrival time of an acoustic signal in one direction with the arrival time of an acoustic signal in the other direction. Thus, the method acts not only on the current information but also on the historic information comprising the result of the previous transmission. This enables information to be derived on the acoustic velocity in the fluid and also the fluid flow velocity independently of each other so that separate independent adjustments may be made to the signals representing these quantities.

In accordance with a second aspect of the present invention, a fluid flow monitor comprises transmitting means for transmitting acoustic signals in opposite directions through a fluid with components in the direction of flow; means for receiving the transmitted signals; means for providing a first signal representing acoustic velocity; integrating means for integrating the first signal with respect to time to produce a ramp signal providing a changing control function the rate of change of which represents acoustic velocity in the fluid; trigger means to cause the transmitting means to transmit a first acoustic signal in one direction through the fluid and to transmit a second acoustic signal in the opposite direction through the fluid and to initiate the integrating means; first comparison means for comparing the ramp signal with a second signal representing fluid flow velocity to generate a first and a second arrival signal according to the direction of the transmitted acoustic signal; second comparison means for comparing expected arrival times for the transmitted acoustic signals, represented by the times at which the first and second arrival signals reach a first threshold, with the actual arrival times of the transmitted acoustic signals, and for storing the results of the comparisons; and third comparison means for comparing the stored results from two successive acoustic signal transmissions either to modify the first signal representing acoustic velocity if both acoustic signals arrived earlier or later than their expected arrival times; or to modify the second signal representing fluid flow velocity if one acoustic signal arrived before and the other after their expected arrival times.

By providing a ramp signal, a far greater control of operation is achieved. Furthermore, the voltage levels needed to provide such a ramp signal are considerably lower than those needed to drive voltage control oscillators. (About 1.5 V rather than 105 V).

In operation, if the magnitude of the first signal is incorrect, then this will cause the rate of change of the ramp signal also to be incorrect thus causing the expected acoustic velocity to be either too high or too low. For example, if the rate of change is too fast then the expected time for each transmitted acoustic signal will be earlier than the actual arrival time and an appropriate modification of the first signal is then made to reduce the rate of change of the ramp signal until the rate of change is such that when the ramp reaches a predetermined threshold (conveniently zero volts) this coincides with the mean of the upstream and downstream flight times. Since the fluid is flowing relative to the transmitting means, the two flight times will be slightly different. This difference is compensated for by comparing the ramp signal with a signal representing fluid flow velocity. Clearly, an acoustic signal transmitted in an upstream direction will arrive later than one transmitted in a downstream direction so that the expected time of arrival of an upstream signal should be later than for a downstream signal.

Conveniently, a portion of the ramp signal on either side of the threshold is amplified in order to increase resolution. This is particularly advantageous in view of the very small differences in upstream and downstream flight times as compared with the overall flight times. A typical mean flight time for a 10 cm path length is 100 microseconds with a difference of 0.5 microseconds between upstream and downstream times. Additionally, the amplified portion of the ramp signal may be inverted.

Preferably, the second signal representing fluid flow velocity is a D.C. signal, the monitor including chopping means to chop the second signal at the upstream/downstream rate to provide a flow voltage chopped into a square waveform symmetrical about a mean voltage, the chopped voltage being fed to the first comparison means such that the first comparison means threshold will be modified to adjust the time at which the ramp signal crosses the threshold depending upon whether the respective acoustic signal was transmitted upstream or downstream.

Preferably, pulse generator means connected to the third comparison means are provided for generating a variable magnitude update pulse for modifying either the flow velocity signal or the acoustic velocity signal, the means adapting the magnitude of the update pulse in correspondence with the size of the modification required. This is particularly useful at start up and also where there is sudden change in flow velocity or temperature. For example, if there is a sudden change in flow velocity, the second comparison means will indicate a constant logic condition indicating that the signal representing fluid flow velocity must be increased. While the logic condition remains the same, each successive update pulse is increased in duration until the logic condition changes when preferably the update pulse returns to a minimum duration. In this way, any changes that are required will be far more rapidly carried out than if a single size update pulse only was available.

One problem which has arisen with previous fluid flow monitors is that two high voltage switching elements are required. Any difference in the speed of operation of the two transmit elements will cause a zero shift.

In order to deal with this problem, the transmitting means may be arranged to transmit acoustic signals in response to an excitation signal generated when a respective charge storage device is discharged by the trigger means, the monitor further comprising a voltage source; logic means; and threshold sensing means for sensing when the ramp signal reaches a second threshold, whereupon the voltage source is applied to one of the charge storage devices selected by the logic means, whereby a charge is stored by the one charge storage device, the trigger means being arranged subsequently to the discharge of the one charge storage device, the logic means subsequently selecting the other charge storage device whereby the charge storage devices are each charged and discharged alternately.

With this arrangement, high voltage switching is avoided by first charging and discharging the one charge storage device and then charging and discharging the other charge storage device.

Conveniently, the trigger means and the threshold sensing means include a flip-flop which takes up one state to cause the charge storge devices to discharge and takes up another state when the ramp signal reaches the second threshold to cause the voltage source to be applied.

Conveniently, the charge storage devices are capacitors and the transmitting means include a pair of electro-mechanical transducers.

In practice, it is convenient if the monitor further comprises delay means to delay initiation of the ramp signal for a short time after the trigger means has been triggered in order to compensate for external delays in the acoustic path. Typically the delay may be set to 17.5 microseconds. Furthermore, it has been found that the delay required may be slightly different depending on whether the acoustic signal is to be transmitted upstream or downstream and thus preferably the delay means is arranged to provide two delay times corresponding to the respective directions to which the acoustic signal is to be transmitted.

It is particularly convenient if the same circuitry is utilized as far as possible for processing received upstream and downstream signals. This may conveniently be achieved by connecting the receiving means to multiplexing means.

Although the apparatus, monitor methods in accordance with the present invention will commonly be used for determining the flow of liquids through pipes or other conduits, they may also be used for monitoring the speed of boats or other objects moving through a liquid.

BRIEF DESCRIPTION OF THE DRAWING

An example of a fluid flow monitor and a method of monitoring fluid flow in accordance with the present invention will now be described with reference to the accompanying drawings, in which.

DESCRIPTION OF THE PREFERRED EMBODIMENTS

Figure 1:
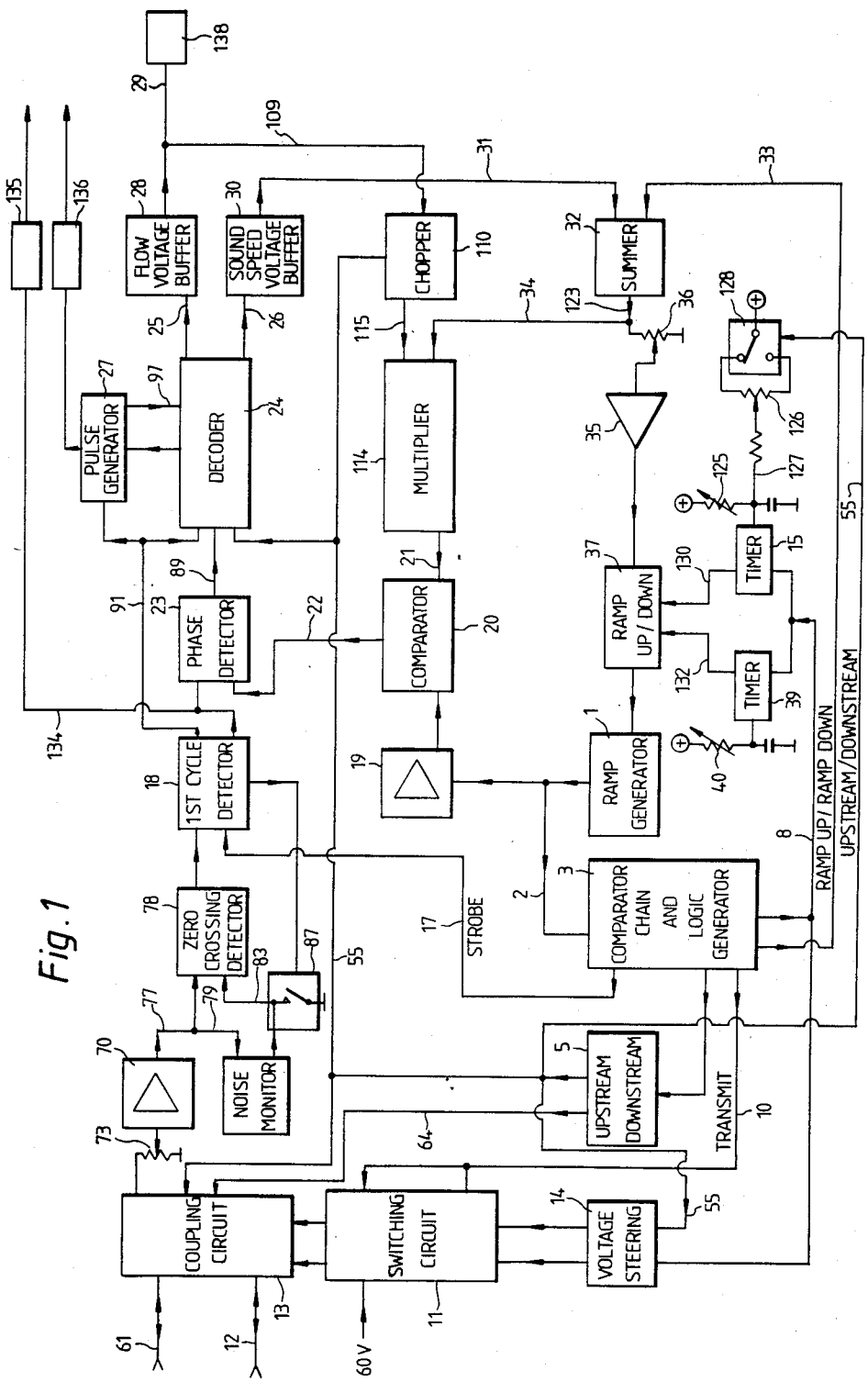
FIG. 1 is a block diagram of the monitor.
Figure 8:
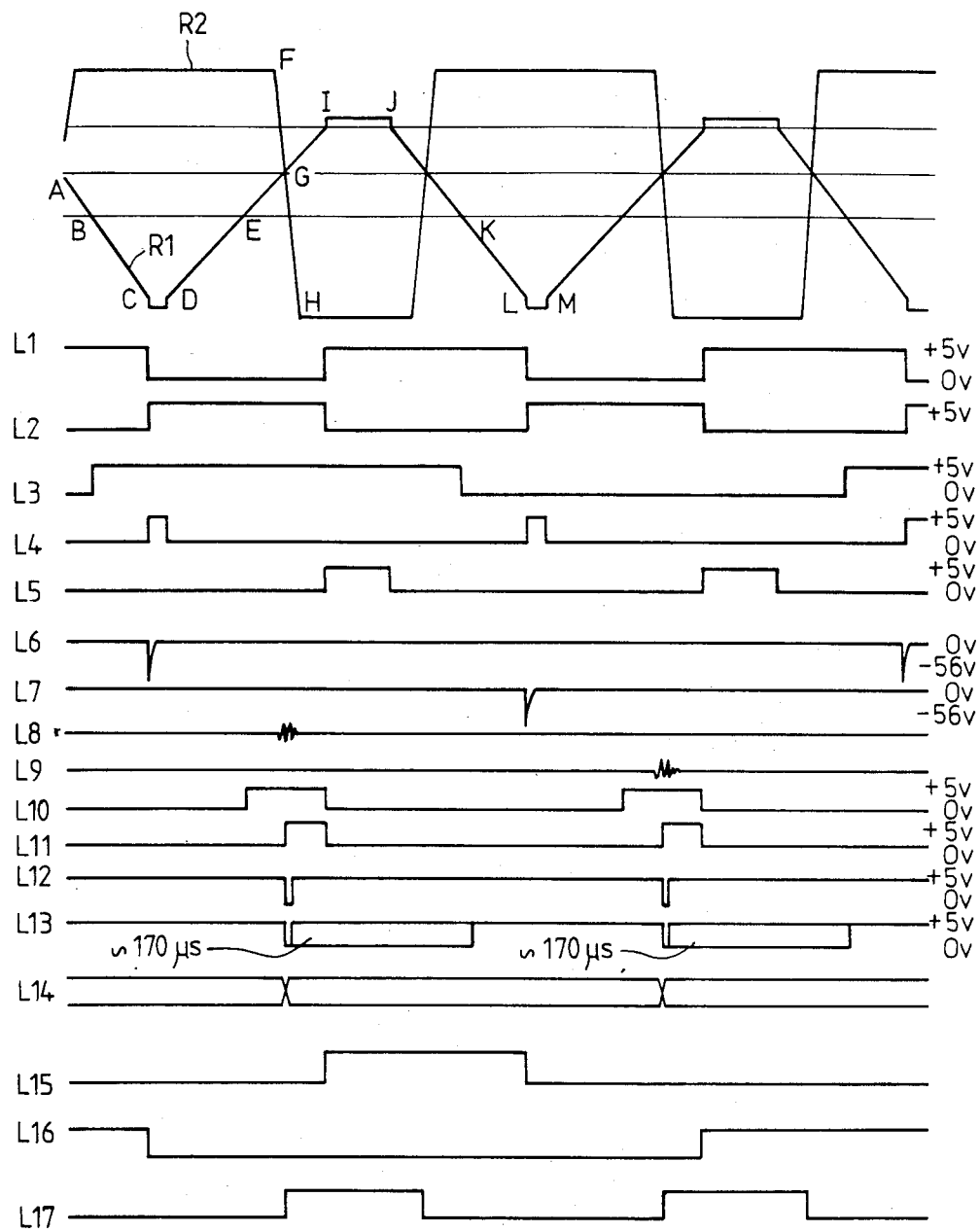
FIG. 8 is a pulse sequence diagram.

The monitor shown in FIG. 1 comprises a ramp generator 1 which generates a linear ramp signal R1 illustrated in FIG. 8. The form of the ramp signal R1 and the way in which it controls operation of the monitor can be best understood by following through one complete operating cycle. The ramp signal R1 is fed along a line 2 from the ramp generator 1 to a comparator chain and logic generator 3. The comparator chain and logic generator 3 is shown in more detail in FIG. 2. Starting at a point A in FIG. 8, the ramp R1 decreases to a point B where it crosses the threshold of a comparator 4. This clocks an UPSTREAM/DOWNSTREAM flip-flop 5 and reverses its output phase (see logic trace L3 in FIG. 8). The ramp signal R1 continues to decrease until the threshold of a very high speed comparator 6 is reached (point C) at which time various events occur:

1. A ramp up/ramp down flip-flop 7 is set to "ramp up" (logic trace L2) sending a signal along a line 8 to a transistor 9 which causes the ramp generator 1 to reverse direction.
2. The logical complement of the output from the flip-flop 7 forms a trigger signal (logic trace L1) which is fed along a line 10 to a switching circuit 11. The switching circuit will send a transmit signal to one of a pair of transducers along a line 12 via a transducer coupling circuit 13. The transducer causes a negative going 56 volt amplitude regulated pulse to be transmitted into the fluid (logic trace L6).
3. The positive output from the flip-flop 7 is also fed along the line 8 to a transmit voltage steering flip-flop 14 which is clocked, the output being fed to switching circuit 11 (logic trace L16). This will be explained in more detail later.
4. The positive going output on line 8 is also fed to a timer 15 which prevents the commencement of the ramp signal until point D. This enables the effect of fixed delays in the acoustic flight path to be compensated for. The delay signal generated by the timer 15 is illustrated by logic trace L4.

After a short time the ramp signal will cross over the threshold of comparator 4 at E and the output of comparator 4 (FIG. 2) will enable a NOR gate 16 which will provide a positive "strobe" pulse on a line 17 (logic trace L10). The strobe pulse L10 enables a first cycle detector 18.

The ramp signal generated by the ramp generator 1 is also fed to an inverting amplifier 19 which has a gain of 10. As the ramp signal R1 reaches a point F, the inverting amplifier 19 will come out of saturation and ramp downwards at a rate 10 times faster than the rate of increase of the ramp signal R1, as illustrated by R2 in FIG. 8. The inverted, amplified ramp signal R2 is fed to a comparator 20 where it is compared with a chopped voltage signal entering the comparator 20 along a line 21. When the fast ramp signal R2 crosses the comparator threshold the comparator 20 will change state (logic trace L17). This change of state will, when the monitor is locked to the liquid flight time, be very nearly coincident with the rising edge generated by the first cycle detector 18 on detecting a received acoustic signal (logic trace L11).

The output signal from the comparator 20 is fed along a line 22 to a phase detector 23. At point G a comparison is made by the phase detector 23 between the time at which the comparator 20 changed state and the time at which it received a signal from the first cycle detector 18. The resulting early/late signal is fed from the phase detector 23 to a decoder 24 which stores the early/late result and compares it with the previous early/late result and provides either a fluid flow voltage signal update on line 25 or an acoustic speed signal update on line 26. The magnitude of the update supplied along either line 25 or line 26 is determined by a variable magnitude pulse generator 27. The signal on the line 25 is fed to a flow voltage buffer 28 which provides on a line 29 a voltage output varying between ±2 volts representative of fluid flow velocity. The signal on the line 26 is fed to a sound speed correction voltage buffer 30 which provides an output on a line 31 which is fed to a summing amplifier 32. The sound speed update signal on the line 31 is summed with a −1.5 volts reference on the line 33 to produce a signal on a line 34 whose voltage is proportional to the acoustic velocity. A portion of this signal is fed to a buffer 35 from a potentiometer 36 and from there via ramp up/down circuitry 37 to the ramp generator 1. The potentiometer 36 is set at start up so that the resulting time interval D to E (FIG. 8) is exactly that expected (with zero voltage on the line 31) with a fluid of defined temperature, in a pipe of defined size, and with a defined transmission angle.

Returning now to the pulse diagram in FIG. 8, after the fast, inverted ramp R2 has passed through the point G it rapidly reaches negative saturation at point H while the ramp R1 continues to increase to a point I where the threshold of a comparator 38 (FIG. 2) is crossed. At this point I the following events occur;

1. The output from the comparator 38 resets the ramp up/ramp down flip-flop 7 to "ramp down" which causes the transistor 9 to switch off.
2. A timer 39 is triggered for a time set by a potentiometer 40 (logic trace L5). This inhibits the ramp signal R1 from decreasing until point J and sets the rate of operation.
3. The strobe signal on line 17 is ended (logic trace L10).

At this point J, the ramp R1 is allowed to decrease and will again pass through the threshold of the comparator 4 at point K and the positive going output will clock the upstream/downstream flip-flop 5 and reverse its outputs as shown on logic trace L3.

The ramp signal R1 then deceases to a point L where a new transmit cycle is started.

The construction and operation of various parts of the monitor will now be described in more detail.

TRANSMISSION CIRCUITRY

Figure 3:
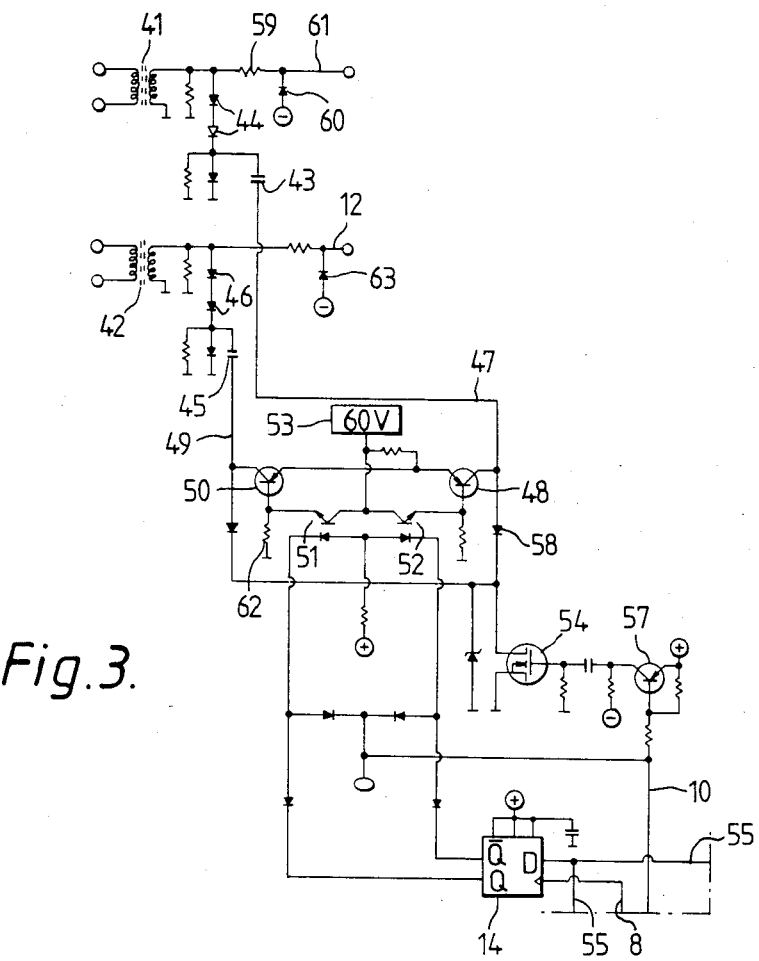

The transmission circuitry is shown in more detail in FIG. 3. Two electro-mechanical transducers (not shown) are connected to primary windings of respective transformers 41, 42. The secondary winding of the transformer 41 is connected to a capacitor 43 via two diodes 44, while the secondary winding of the transformer 42 is connected to a capacitor 45 via two diodes 46. The capacitor 43 is connected via a line 47 to a transistor 48, while the capacitor 45 is connected via a line 49 to a transistor 50. The base of each transistor 48, 50 is connected to a respective one of a pair of opto-couplers 51, 52, the collectors of each transistor 48, 50 being connected to a 60 volt source 53, the 60 volt source 53 also being connected to the opto-couplers 51, 52. The diode of the opto-coupler 51 is connected to the Q output of a D flip-flop forming the voltage steering flip-flop 14. The diode of the opto-coupler 52 is connected to the $\overline{Q}$ output of the D flip-flop 14. the line 47 also connects the capacitor 43 to a discharge transistor 54 to which is also connected the capacitor 45 by the line 49. The D input to the flop-flop 14 is connected to the $\overline{Q}$ output of the flip-flop 5 via a line 55, while the clock input to the D flip-flop 14 is connected to the line 8.

In use, when the ramp signal R1 reaches the point C (FIG. 8) the output from flip-flop 7 on line 10 will go low (logic trace L1) and turn both opto-couplers 51, 52 and thus turning off the transistors 48, 50 and thus removing the 60 volt supply 53 from, for example, the capacitor 43. Line 10 going low will also turn on a transistor 57 which will cause the transistor 54 to turn on enabling the capacitors 43, 45 to discharge. For example if the capacitor 43 has been charged then it will discharge via diodes 44, a diode 58, and the secondary winding of the transformer 41 to ground. This causes a very fast negative pulse to be fed to the transducer connected to the primary winding of the transformer 41, the transducer thus being rung and feeding acoustic energy into the fluid (logic trace L6). A resistor 59 and a diode 60 prevent the negative transmit pulse from being transmitted along the line 61.

At the same time, the logical complement signal from the flip-flop 7 (which indicates whether the ramp is increasing or decreasing (logic trace L2) clocks the D flip-flop 14 which has the upstream/downstream signal fed to its data input on the line 55 (logic trace L3). Thus, at the point C, a logical "1" will be clocked into the flip-flop 14. As a result, the Q output will be a logical "1" and the $\overline{Q}$ output will be a logical "0". When the ramp signal R1 reaches its positive limit at I the transmit signal generated by the flip-flop 7 on the line 10 will go high (logic trace L1) and this would tend to switch both opto-couplers 51, 52 off. However, the $\overline{Q}$ output of the flip-flop 14 is a logical "0" and this will hold the diode of the opto-coupler 52 on. Since the opto-coupler 51 is off, this will allow the transistor 50 to switch on due to the base current through a resistor 62. Thus, the capacitor 45 is connected to the voltage source 53 and will be charged to a voltage of about 56 volts (logic trace L15). The capacitor 43 is unable to be charged since the diode 58 is reverse biased. When the next transmission point L is reached, the transistor 54 will again be turned on as previously described allowing the capacitor 45 to discharge resulting in a pulse being emitted by the other transducer (logic trace L7) while the D flip-flop 14 has a logic "0" clocked into it from the upstream/downstream line 55 (logic trace L3). The sequence then repeats with the capacitor 43 being the next to charge (Logic trace L16).

As will be appreciated, one capacitor is charged and discharged before the other capacitor is charged and discharged to avoid the problem of high voltage level switching.

In this case, the transducers both transmit and receive acoustic signals so that an acoustic signal transmitted in response to the capacitor 43 discharging will be received by the transducer connected to the transformer 42 and vice versa (logic traces L8 and L9). A signal resulting from the receipt of an acoustic signal by the transducer connected to the transformer 42 will pass along the line 12 to multiplexing circuitry. Diodes 44, 46 provide isolation of the received signals from the low impedance of the transmission circuitry. Diodes 60, 63 protect the multiplexing circuitry from the −56 volt transmission pulse. The diodes limit the excursion to approx ±5 v. Signals received by the transducer connected to the transformer 41 will be fed to the multiplexing circuitry via the line 61.

MULTIPLEXING CIRCUITRY

Figure 4:
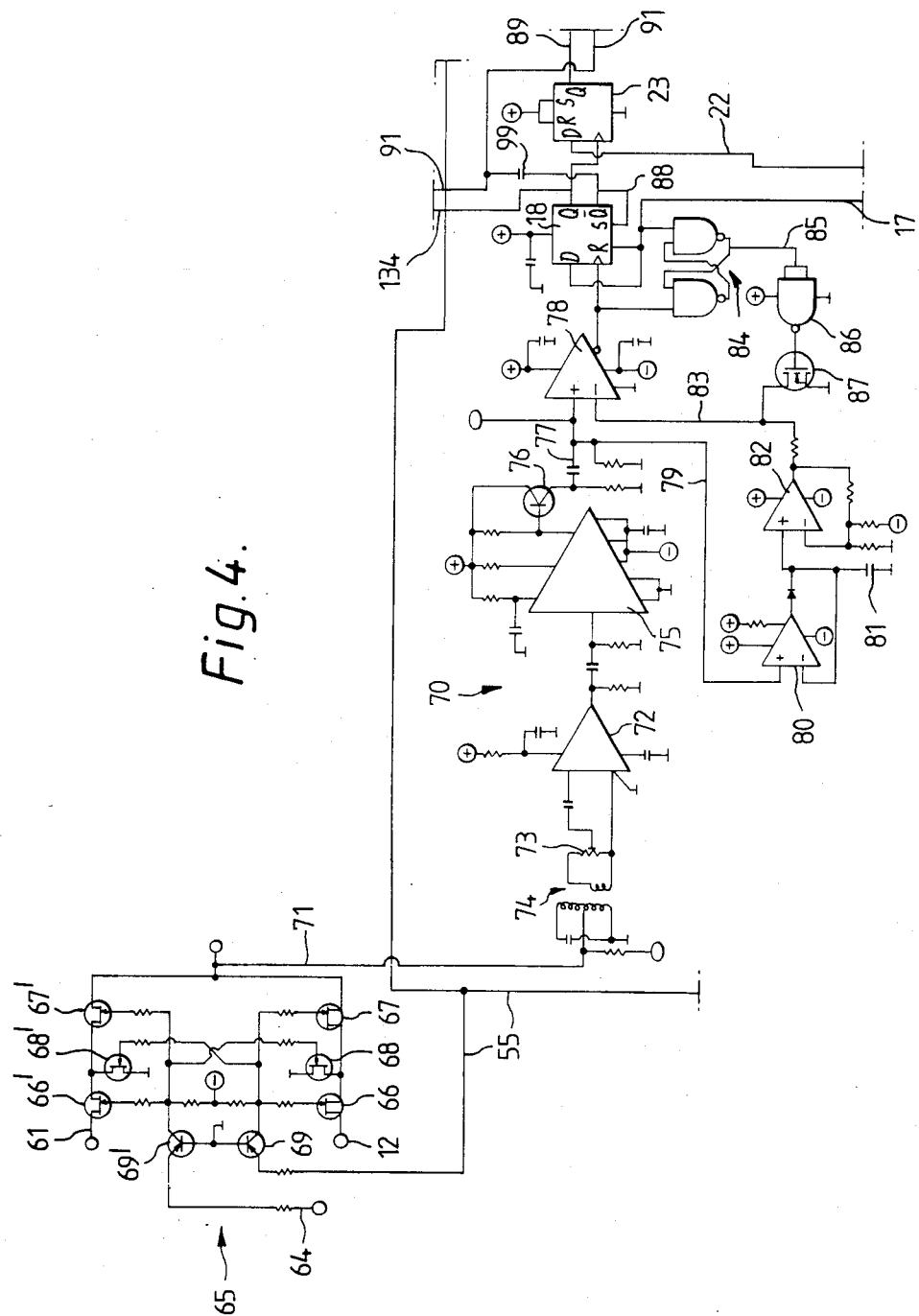

The multiplexing circuitry is indicated at 65 in FIG. 4. Signals from the lines 12, 61 are fed to transistors 66,67 and 66',67' respectively. The multiplexing circuitry also includes transistors 68 and 68' together with a transistor 69 connected to the upstream/downstream line 55 from the $\overline{Q}$ output of the flip-flop 5, and a transistor 69' connected to a line 64 from the Q output of the flip-flop 5.

Assume that an acoustic signal has been received by the transducer connected to the transformer 42 (logic trace L8). This signal will be fed along the line 12 to the transistor 66. At this time the upstream/downstream line 55 (logic trace L3) is high which means that the transistor 69 will switch on the transistors 66, 67, and 68'. Since the signal on the line 64 is the logical complement of the signal on the line 55 the transistor 69' and hence the transistors 66', 67' and 68 will be off. A path is thus provided for the received signal to amplifier circuitry 70 along a line 71. This arrangement gives an estimated isolation between the two channels of about 100 dB at a 1 MHz working frequency.

AMPLIFIER CIRCUITRY

The amplifier circuitry 70 comprises a very low noise, high gain, wide bandwidth operational amplifier 72 the gain of which can be adjusted by means of a potentiometer 73. A transformer 74 provides impedance matching into the amplifier 72. The amplifier circuitry includes a second operational amplifier 75 which amplifies the signal by a further 20 dB (to a maximum total of about 80 dB), the amplifier 75 being connected in an emitter follower configuration with a transistor 76 to provide a low impedance output along a line 77.

At this point, the signal path diverges. One line is connected directly to a non-inverting input of a zero crossing detector 78, while another line 79 is connected to a noise monitor 80.

NOISE MONITOR

The noise monitor constantly monitors and detects the peak noise voltage on the line 77 and stores it as an equivalent charge on a capacitor 81. Noise is generated not only within the circuitry itself but also within the fluid and the monitor provides means for adjusting the noise bias applied to the zero crossing detector 78. The noise monitor 80 is a transconductance amplifier and so will tend to "average the peaks" rather than detect instantaneous peaks. The monitor 80 is connected to a D.C. amplifier 82 with a gain of about 2.2 and even with zero noise input this amplifier will produce a small positive output voltage (about 50 mV). With an average noise level of 100 mV peak fed to the monitor 80, the D.C. potential across the capacitor 81 will be about 80 mV, and the output from the amplifier 82 will be about 200 mV. If the noise level on the line 77 increases, the monitor 80 will detect this and the output from the amplifier 82 will increase accordingly.

The output from the amplifier 82 is fed along a line 83 to the inverting input of the zero crossing detector 78. Since the signal fed to the inverting input of the amplifier 78 is about double the peak noise voltage arriving at the non-inverting input, the output of the zero crossing detector 78 will normally be high since the output from the detector 78 is inverted. As soon as the desired signal is received on the line 77, the amplitude of the signal at the non-inverting input of the detector 78 will exceed the noise bias threshold supplied to the inverting input and the output of the detector 78 will switch low.

The output from the detector 78 is fed to a noise bias flip-flop 84 which is set by the low signal output from the detector 78 so that the output on the line 85 is low. The other input to the flip-flop 84 is the strobe signal on the line 17. The output on the line 85 is inverted by an invertor 86 and the high signal resulting turns on a transistor 87 connected to the line 83. The transistor 87 acts as a switch to short out the noise bias voltage to leave the zero crossing detector 78 in a zero crossing mode.

When the first received positive cycle on the line 77 dies away and crosses through zero, the output from the detector 78 will rise again, clocking a logical "1" to the first cycle detector 18 which is a D flip-flop. The D input of the flip-flop 18 is connected to the strobe signal on the line 17. The $\bar{Q}$ output of the D flip-flop 18 is connected to the SET input by a line 88, so that the flip-flop 18 remains locked in its clocked condition. The single rising edge output of the D flip-flop 18 is used to clock the phase detector 23 which is also a D flip-flop.

The data input to the flip-flop 23 is connected by the line 22 to the comparator 20 so that the output from the flip-flop 23 depends entirely on whether or not the output from the flip-flop 18 (representing the arrival of an acoustic pulse at one of the transducers) arrived before the ramp R2 crossed the zero volt threshold (logic trace L14). If the acoustic pulse arrived before the ramp signal R2 crossing then the signal on the line 22 (which will have been a logical "0") will be clocked into the Q output of the flip-flop 23. Otherwise, a logical "1" will be clocked into the Q output. At this point the early/late decision has been made and this is fed along a line 89 to a decoder.

THE DECODER

It is advisable to recall at this stage that the transit time of ultrasonic energy through the fluid is dependent on three factors, namely, the path length, the velocity of sound through the fluid, and the average velocity component of the fluid itself across the acoustic path. The path length is catered for by the initial presetting of the ramp (and hence the time it takes to reach the 0 volt crossing threshold at point G) by adjusting the potentiometer 36. However, the velocity of sound through the fluid and the fluid velocity components are both dynamic quantities and are intimately related. The decoder to be described extracts information from each of these components and separates them into two isolated quantities: A voltage proportional to sound speed and another voltage proportional to the flow component. It is then possible to compute the actual or true flow velocity independent of any fluid sound speed changes.

To accommodate fluid sound speed changes the ramp signal is made to alter its slope such that when it crosses the zero volt threshold, this point coincides exactly with the mean of the upstream and downstream flight times. It is controlled constantly to achieve this. With the fluid in motion, the upstream and downstream flight times will be slightly different and in fact this difference is proportional to the flow velocity divided by the square of the sound speed.

Figure 9:
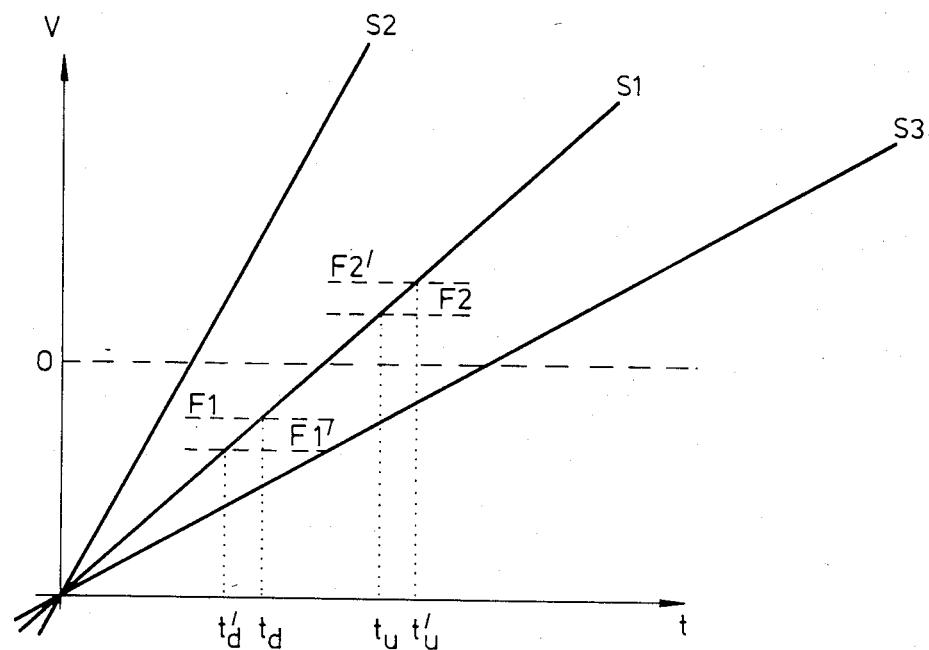
FIG. 9 is a graph indicating three alternative forms of the ramp signal.

The theory may be more easily appreciated with reference to the graph shown in FIG. 9. It is assumed that the actual arrival times of acoustic pulses in the upstream and downstream directions are $t_u$ and $t_d$ respectively. If the slope of the ramp signal R1 is correct then it will take the form indicated by S1 which crosses the zero volt line at the mean of the two actual arrival times. Thus if the threshold crossing time is compared with the actual arrival times it will be determined that one actual arrival time is earlier and one is later than the estimated arrival time corresponding to when the ramp crosses the zero threshold. If the estimate of the sound speed was too great then the slope of the ramp R1 would be too great as for example illustrated by S2. In this case, both actual arrival times would be later than the estimated arrival time. Similarly, if the estimate of the sound speed was too low then both the actual arrival times would be earlier than the estimated arrival time. An example of such a ramp is S3. So by determining whether the estimated time lies between the two arrival times, compensation can be made for errors in the estimated sound speed.

As has been previously explained, the ramp signal R1 is compared with a signal representing fluid flow and this results in the shifting of the time at which the ramp signal R1 crosses the fluid flow signal. These times will be slightly before and slightly after the time at at which the ramp itself crosses the zero volt line, the actual crossing time of the ramp through zero volts is therefore the mean of the two times. This is indicated for example by the dashed lines F1, F2 parallel with and on either side of the zero volt line. F1 and F2 represent the chopped flow voltage being fed to the comparator 20. If, for example, the fluid flow signal F1, F2 represents a flow which is too high then in the downstream case the estimated arrival time will be earlier than the actual arrival time. However, in the upstream case, the actual arrival time of the acoustic signal will be earlier than the estimated time. This may be seen in the graph in FIG. 9 in which the ramp S1 crosses the F1' line at a time $t'_d$ before $t_d$. while the ramp S1 crosses the F2' line at a time $t'_u$ after $t_u$.

Figure 5:
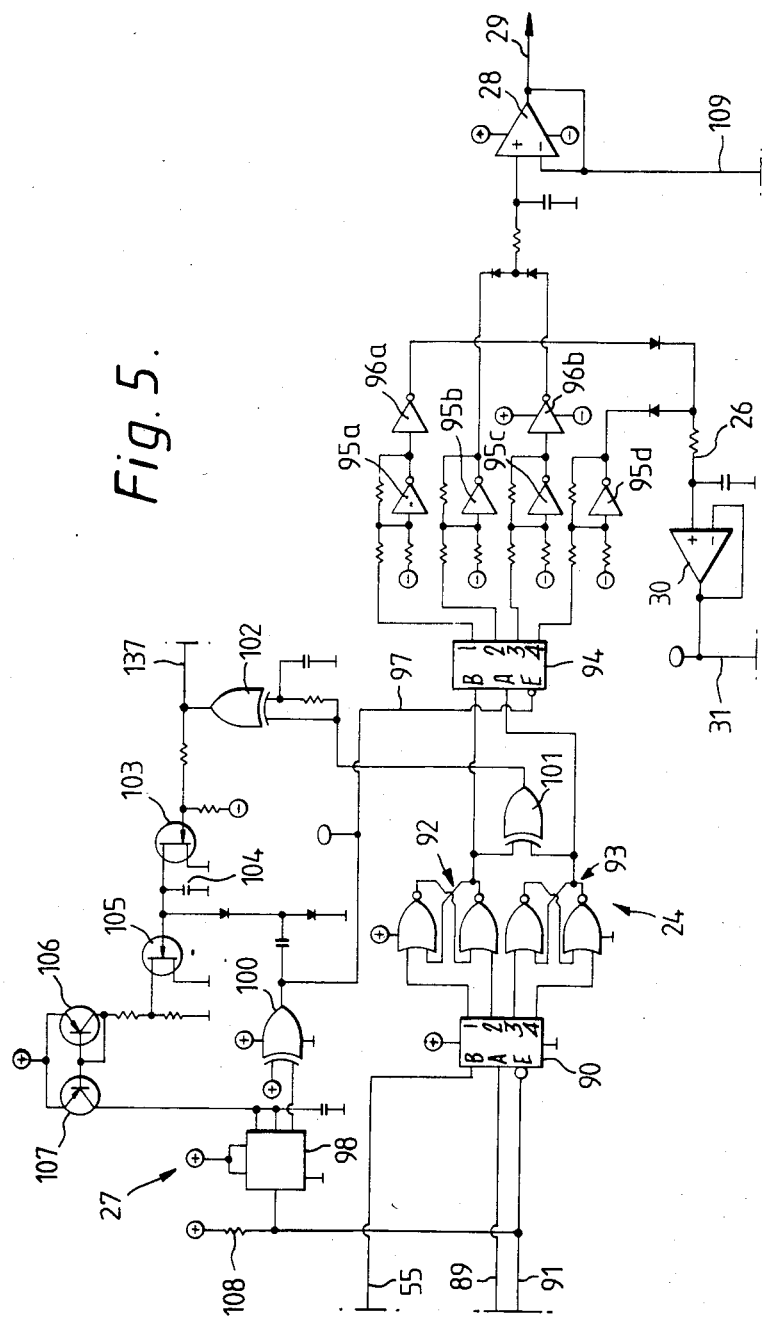
Figure 7:
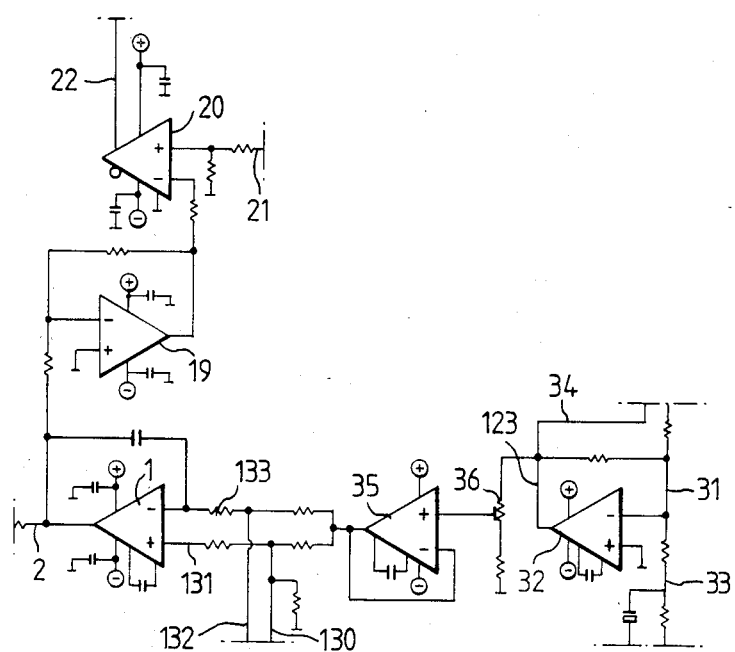

The decoder 24 is illustrated in FIG. 5. The decoder comprises an integrated circuit 90 having one input connected to the upstream/downstream line 55, another input connected to the line 89 from the phase detector 23, and an enable input connected by a line 91 to the $\bar{Q}$ output of the first cycle detector 18. Since the integrated circuit 90 is connected to the upstream/downstream line 55 it can separate the incoming signals between those resulting from upstream transmissions and those resulting from downstream transmissions. Since its enable input is conected to the first cycle detector 18, the integrated circuit 90 will only be enabled when a signal is received. The output from the integrated circuit 90 depends therefore on whether the incoming signal was an upstream or downstream signal and also depends on the early/late result from the phase detector 23. The integrated circuit 90 is connected to an upstream memory flip-flop 92 and a downstream memory flip-flop 93. If the estimated time of arrival of a signal (corresponding to the time at which the ramp signal R2 crosses the chopped flow voltage threshold) is earlier than the actual arrival time, then the integrated circuit 90 will cause a logical "1" to be stored in the respective memory 92, 93; while if the estimated arrival time is later than the actual arrival time, then the integrated circuit 90 will cause a logical "0" to be stored in the respective memory. It will be seen therefore that the two memories 92,93 store sufficient information to enable the type of correction required to be determined. Four conditions are possible:
1. If both memories store a logical "1", then the slope of the ramp is too steep representing an over estimate of sound velocity in the fluid.
2. If both memories store a logical "0" then the slope of the ramp is too shallow representing an under estimate of sound velocity in the fluid.
3. If the memory 92 stores a logical "0" and the memory 93 stores a logical "1" then the generated flow voltage is too low.
4. If the memory 92 stores a logical "1" and the memory 93 stores a logical "0" then the voltage representing flow is too high.

Flow direction is not mentioned in connection with the flow voltage since of course the monitor is bi-directional.

The decoder 24 also includes a further integrated circuit 94 which decodes the information stored in the memories 92, 93 and outputs appropriate commands. The integrated circuit 94 is connected to a set of four integrators 95a, 95b, 95c, 95d. The integrators 95a and 95c are connected in series with respective inverters 96a, 96b. The integrators 95a and 95d provide a negative and a positive update voltage respectively to the sound velocity buffer 30. The integrators 95b and 95c deliver positive and negative voltages respectively to the flow voltage signal buffer 28. The magnitude of the signal is determined by the signal fed to the enable input of the integrated circuit 94 through the line 97, that signal being controlled by the variable pulse generator 27.

VARIABLE PULSE GENERATOR

The variable pulse generator 27 comprises a timer 98 which is connected to the Q output of the first cycle detector 18 via the line 91 and a capacitor 99 (FIG. 4). The output from the timer 98 is connected to an inverter 100, the output of which is connected via the line 97 and an inverter to the enable input of the integrated circuit 94. An EXOR gate 101 is connected to the memories 92, 93 and its output is connected to a pulse generator 102. The output of the pulse generator is connected to the base of a transistor 103 which is connected between a capacitor 104 and a transistor 105. Transistors 106, 107 are connected to the transistor 105 and also to the timer 98 to control the length of the timing pulse.

DECODER UPDATING

When a received signal is detected by the first cycle detector 18, the $\overline{Q}$ output of the first cycle detector will be a logical "0". This in conjunction with the capacitor 99 and a resistor 108 will provide a negative going 1 micro-second pulse which enables the integrated circuit 90 (as previously described) (logic trace L12) and triggers the timer 98. The integrated circuit 98 will update one of its four output lines, updating the relevant memory. The timer 98 will provide a negative going output pulse at the output of the inverter 100 which is the enable pulse for the integrated circuit 94.

Normally, when the signals representing sound speed and flow velocity are substantially correct, the values stored in the memories 92, 93 will be constantly alternating, as minor corrections are made in both the sound speed and flow voltage loops. These constantly changing conditions are passed through the EXOR gate 101 to the pulse generator 102. The positive going pulses switch on the transistor 103 and discharge the capacitor 104. As has previously been mentioned, the output of the inverter 100 is also connected to the capacitor 104 so that each time the timer 98 is triggered a small negative charge is stored by the capacitor 104. If the charge on the capacitor 104 is allowed to build up, the transistor 105 gradually cuts off thus reducing the current through the transistors 106, 107 and as this happens the pulse width of the timer 98 increases. Such an increase does not normally happen and the timer 98 usually provides 1 microsecond update pulses. (logic line L13).

However, if there is a sudden increase in the flow rate, the memories 92, 93 will indicate a constant "increase flow volts" condition because the system will be on fine resolution (i.e. the timer 98 will be generating its shortest 1 microsecond update pulse). The EXOR gate 101 sees a constant logic condition and so the pulse generator 102 will no longer generate pulses. This will allow the capacitor 104 to charge negatively thus progressively cutting off the transistor 105 and thereby increasing the pulse length generated by the timer 98 due to the charging current through the transistor 107 being reduced. With each update the generated flow voltage will be increased in larger and larger steps until at some instant it exceeds the actual flow. At that point the EXOR gate 101 will see a logic change, the pulse generator 102 will produce its pulse, the transistor 103 will discharge the capacitor 104 and the timer 98 will return to providing its fine resolution 1 micro-second pulse. The maximum size of the pulse generated by the timer 98 may be up to 170 microseconds and is indicated by logic trace L13.

CHOPPER CIRCUIT

Figure 6:
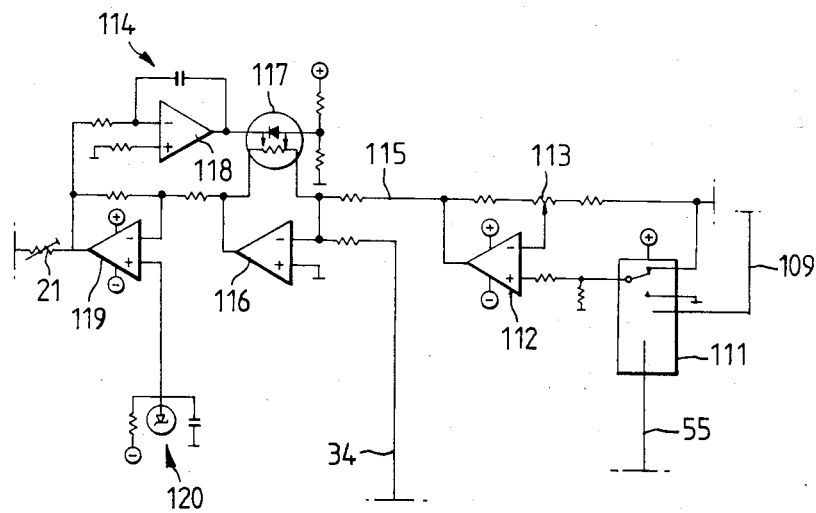

As well as being fed along the line 29, the signal representing fluid flow velocity is also fed along a line 109 to a chopper circuit 110. This is shown in more detail in FIG. 6. The chopper circit 110 comprises an integrated circuit 111 to which the line 109 is connected together with the line 55 which carries the upstream/downstream signal. The output from the integrated circuit 111 is fed to the non-inverting input of an operational amplifier 112 the inverting input of which is connected to a potentiometer 113. The chopper circuit chops the D.C. voltage arriving along the line 109 into a square wave form at the upstream/downstream frequency as supplied along the line 55. The potentiometer 113 enables the square wave form to be controlled to be symmetrical about zero volts.

The output from the chopper circit 110 is then fed to a multiplier 114 along a line 115.

THE MULTIPLIER

It was previously stated that the difference between the two flight times is proportional to the fluid flow velocity divided by the square of the speed of sound in the fluid. The correction of the rate of increase of the ramp (that is its slope) is directly dependent on the speed of sound in the fluid as previously mentioned but that means that the voltage signal representing fluid flow would still be sound speed dependant. If the signal representing fluid flow were not to be further processed then the output signal would be inversely proportional to sound speed. For this reason, the chopped signal from the chopper circuit 110 is fed to the multiplier 114.

The multiplier 114 comprises a variable gain operational amplifier 116 having a cadmium sulphide cell 117 as its feed back resistance. The gain of the operational amplifier 116 is unity when the sound speed correction signal on the line 31 is zero. An integrator 118 is connected to the cadmium sulphide cell 117, the integrator 118 monitoring the means voltage output of a negatively biased operational amplifier 119.

As will be explained later, the signal on the line 34 connected to the inverting input of the amplifier 116 is directly proportional to the speed of sound in the fluid while the signal on the line 115 is the chopped flow voltage from the chopper circuit 110. The output from the amplifier 116 will therefore be about −1.5 volts (the exact value depending on the instantaneous speed of sound in the fluid) with the chopped flow voltage superimposed on it. This output voltage is fed to the inverting input of the negatively biased amplifier 119, the non-inverting input of which is connected to a −1.26 volt reference generated by the diode circuit 120. The output from the amplifier 119 will be the chopped flow voltage symmetrical about ground provided that the mean of the output from the amplifier 116 is the same as the −1.26 volt reference. The integrator 118 monitors the mean voltage output of the amplifier 119 and maintains it at ground potential by adjusting the gain of the amplifier 116 by varying illumination of the light emitting diode of the cadmium sulphide cell 117.

The time constant of the integrator 118 and the cadmium sulphide cell 117 is very long compared with the up/down frequency and is therefore not affected by the chopped flow component.

It can now be seen that should the ramp control voltage (on the line 34) increase due to an increase in the speed of sound in the fluid, the gain of the amplifier 116 will be reduced proportionately to maintain balance. At the same time, the chopped flow component will also be reduced by the same proportion, but because the multiplier circuit is in the feed back loop, the fluid flow voltage must increase proportionately to maintain balance. Thus effectively the voltage on the line 115 has been multiplied by the voltage on the line 34. The flow voltage output by the decoder 24 is thus now independent of the speed of sound in the fluid. The output from the amplifier 119 is fed on the line 21 to the comparator 20 as previously described.

RAMP SIGNAL GENERATION

Figure 2:
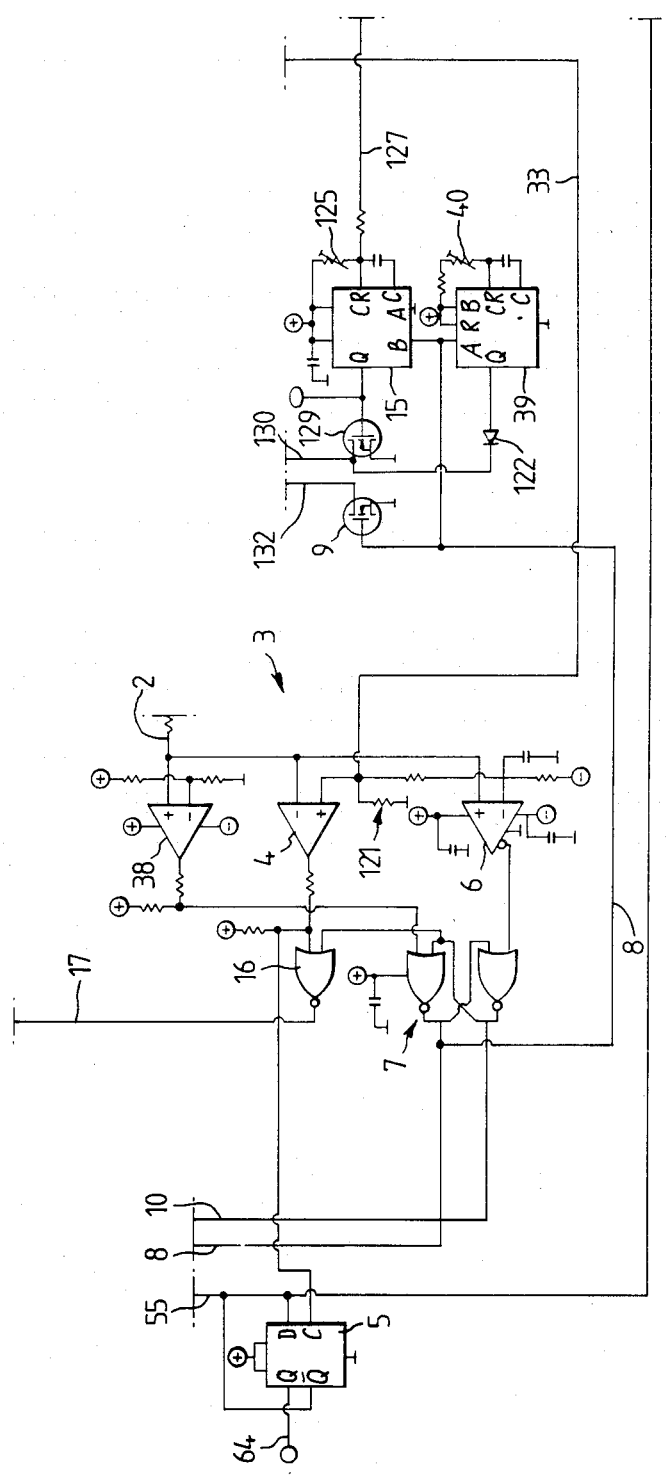
FIGS. 2 to 7 are circuit diagrams of parts of the monitor shown in FIG. 1.

The ramp signal R1 is primarily dependent on a D.C. voltage of approximately −1.5 volts derived from a resistor network 121 (FIG. 2). This is fed along a line 33 to the inverting input of the summing amplifier 32. The sound speed correction voltage from the buffer 30 is also fed to the summing amplifier 32 along a line 31. The summing amplifier 32 sums the two signals to provide an output voltage signal on a line 123 which is directly proportional to the speed of sound in the fluid. The signal on the line 123 is fed via the line 34 to the multiplier 114 as previously described, and is also fed to the potentiometer 36 which enables the signal to be adjusted for the acoustic path length. The signal is fed from the potentiometer 36 to the buffer 35 and thence to the integrator 1. The output from the integrator 1 is fed to the inverting amplifier 19 having a gain of 10 and then to the comparator 20. In this example the ramp swings between a negative voltage of −3.3 volts and a positive voltage of about +1.6 volts. As the ramp reaches its most negative limit (point C in FIG. 8) the comparator 38 will switch setting the ramp up/ramp down flip-flop 7 causing a positive pulse to be transmitted along the line 8 to the transistor 9 and to the timer 15 which it starts. The delay time of the timer 15 is set by a potentiometer 125 and is further adjusted by a potentiometer 126 (FIG. 1) connected to the timer 15 by a line 127. A typical external delay time in the acoustic path is about 17.5 micro-seconds but slight differences in the order of ±50 nanoseconds are common and these are compensated for by adjusting the potentiometer 126. The potentiometer 126 is connected to a switch 128 which is switched by the upstream/downstream signal on the line 55. Conveniently, the switch 128 and the potentiometer 126 may form part of the integrated circuit 111 of the chopper circuitry.

The Q output of the timer 15 is connected to a transistor 129 which is connected via a line 130 to a line 131 connecting the buffer 35 to the integrator 1. The transistor 9 is connected via a line 132 to a line 133 connecting the buffer 35 to the inverting input of the integrator 1 (see FIG. 2).

At the point C of the ramp signal R1, a logic "1" signal is applied by the flip-flop 7 to the transistor 9 via the line 8 while a logic "1" signal is also applied to the transistor 129 from the timer 15. At this stage therefore both transistors 9,129 are turned on and a charging voltage on the lines 131,133 from the buffer 35 is grounded and no signal is integrated by the integrator 1. After the delay set by the timer 15, the Q output becomes a logical "0" (logic trace L4) while the signal on the line 8 remains logic "1". At this point, the line 131 is no longer grounded through the line 130, and the charging voltage from the buffer 35 is transmitted to the non-inverting input of the integrator 1. When the ramp signal R1 approaches its positive limit, the comparator 38 again switches causing the flip-flop 7 to reset and a logic "0" to be applied via the line 8 to the transistor 9, thus switching it off, and also to the timer 39. The Q output of the timer 39 causes the output of the integrator 1 rapidly to saturate by forcing the voltage on the line 131 to be higher than the voltage output from the buffer 35. When the timer 39 has timed out its Q output will switch low, reverse bias a diode 122, and allow the voltage output from the buffer 35 to be applied to the inverting input of the integrator 1 along the line 133. When the ramp signal R1 reaches its lower limit the cycle then repeats. Conveniently, the four resistors in the lines 131, 133 each have the same value (e.g. 10 kΩ).

FAULT INDICATION

The Q output from the first cycle detector is fed along a line 134 to a re-triggerable one shot multivibrator 135. On the loss of received pulses corresponding to received acoustic signals, the multivibrator 135 will time out and illuminate a light emitting diode.

A timer 136 is connected via a line 137 to the output of the pulse generator 102 to monitor the pulses from the pulse generator. If there is any fault in the entire control system then these pulses will cease and the timer 136 is arranged to illuminate a fault light after a set time of for example 7 seconds.

OUTPUT CIRCUITRY

The signal on the line 29 is a voltage representing fluid flow speed and this signal may be fed to a calibrated voltmeter 138 to provide a suitable visual display of fluid flow. Alternatively, the signal on the line 29 may be fed to a conventional digital panel meter such as that known by the code number 1CL7107CPL. The advantage of a digital panel meter is that it is absolutely bipolar in operation, has an automatic zero, has polarity indication, and is able, with simple logic, to provide a uni-polar pulse whose width is proportional to the magnitude of the input voltage on the line 29. The advantage of automatic zeroing is that zero drift errors are eliminated. Polarity indication is useful since this gives an indication of flow direction.

It may also be desirable in some cases to include totalizer facility. A conventional electronic unit may be provided to generate an output representative of the volume rate of fluid flow.

Typical components which may be used in the monitor are:

Integrated circuits 90, 94—MC114555.
Pulse generator 102—CD4007B

I claim:

1. A method of monitoring fluid flow comprising causing acoustic signals to be transmitted through said fluid in opposite first and second directions with components in the direction of flow, successive ones of the said acoustic signals being transmitted alternately in said first and second directions through said fluid, and initiating in correspondence with each said acoustic signal a changing control function the rate of change of which represents acoustic velocity in said fluid; receiving said transmitted acoustic signals; generating a signal representing fluid flow velocity; comparing said control function with said signal representing fluid flow velocity to generate expected arrival times for said transmitted acoustic signals, represented by times at which said control function reaches a threshold; comparing said expected arrival times with the actual arrival times of said transmitted acoustic signals, and storing the results of said comparisons; and comparing said stored results from two successive acoustic signal transmissions either to modify the rate of change of said control function if both said acoustic signals arrived earlier or later than their respective expected arrival times, or to modify said signal representing fluid flow velocity if one acoustic signal arrived before and the other after their expected arrival times.

2. A fluid flow monitor comprising transmitting means for transmitting acoustic signals in opposite first and second directions through a fluid with components in the direction of flow; means for receiving said transmitted signals; means for providing a first signal representing acoustic velocity; means for providing a second signal representing fluid flow velocity; integrating means for integrating said first signal with respect to time to produce a ramp signal providing a changing control function the rate of change of which represents acoustic velocity in the fluid; trigger means to cause said transmitting means to transmit a first acoustic signal in said first direction through said fluid and to transmit a second acoustic signal in said second opposite direction through said fluid and to initiate said integrating means; first comparison means for comparing said ramp signal with said second signal representing fluid flow velocity to generate a first and a second arrival signal according to the direction of said transmitted acoustic signal; second comparison means including storage means for comparing expected arrival times for said transmitted acoustic signals, represented by the times at which said first and second arrival signals respectively reach a first threshold, with the actual arrival times of said transmitted acoustic signals, and for storing the results of said comparisons; and third comparison means for comparing said stored results from two successive acoustic signal transmissions either to modify said first signal representing acoustic velocity if both said acoustic signals arrived earlier or later than their respective expected arrival times, or to modify said second signal representing fluid flow velocity if one acoustic signal arrived before and the other after their expected arrival times.

3. A monitor according to claim 2, wherein a portion of said ramp signal on either side of said first threshold is amplified in order to increase resolution.

4. A monitor according to claim 2, wherein said second signal representing fluid flow velocity is a D.C. signal, said monitor including chopping means to chop said second signal at the upstream/downstream rate to provide a flow voltage chopped into a square waveform symmetrical about a mean voltage, said chopped voltage being fed to said first comparison means such that said first comparison means threshold will be modified to adjust the time at which said ramp signal crosses the threshold depending upon whether the respective acoustic signal was transmitted upstream or downstream.

5. A monitor according to claim 2, wherein pulse generator means connected to said third comparison means are provided for generating a variable magnitude update pulse for modifying either said flow velocity signal or said acoustic velocity signal, said pulse generator means adapting the magnitude of said update pulse in correspondence with the size of the modification required.

6. A monitor according to claim 2, the monitor further comprising a voltage source; logic means; two charge storage devices, said transmitting means being adapted to transmit said acoustic signals in response to an excitation signal generated with a respective charge storage device is discharged by said trigger means; and threshold sensing means for sensing when said ramp signal reaches a second threshold, whereupon said voltage source is applied to one of said charge storage devices selected by said logic means, whereby a charge is stored by said one charge storage device, said trigger means being adapted subsequently to discharge said one charge storage device, said logic means subsequently selecting said other charge storage deivce whereby said charge storage deivces are each charged and discharged alternately.

7. A monitor according to claim 6, wherein said trigger means and said threshold sensing means include a flip-flop which takes up one state to cause said charge storage devices to discharge and takes up another state when said ramp signal reaches said second threshold to cause said voltage source to be applied.

8. A monitor according to claim 2, further comprising delay means to delay initiation of said ramp signal for a short time after said trigger means has been triggered in order to compensate for external delays in the acoustic path.

9. A monitor according to claim 8, wherein said delay means is arranged to provide two delay times corresponding to said respective first and second directions in which said acoustic signal is to be transmitted.

* * * * *